(12) United States Patent
Tsushima et al.

(10) Patent No.: US 12,191,086 B2
(45) Date of Patent: Jan. 7, 2025

(54) MULTILAYER CERAMIC ELECTRONIC DEVICE AND MANUFACTURING METHOD OF THE SAME

(71) Applicant: TAIYO YUDEN CO., LTD., Tokyo (JP)

(72) Inventors: Yuji Tsushima, Tokyo (JP); Yasuhiro Matsumoto, Tokyo (JP); Koichiro Morita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 132 days.

(21) Appl. No.: 18/114,539

(22) Filed: Feb. 27, 2023

(65) Prior Publication Data

US 2023/0290577 A1    Sep. 14, 2023

(30) Foreign Application Priority Data

Mar. 10, 2022 (JP) ................................ 2022-037359

(51) Int. Cl.
*H01G 4/30* (2006.01)
*H01G 4/012* (2006.01)
*H01G 4/248* (2006.01)

(52) U.S. Cl.
CPC ............ *H01G 4/302* (2013.01); *H01G 4/012* (2013.01); *H01G 4/248* (2013.01)

(58) Field of Classification Search
CPC ........ H01G 4/302; H01G 4/012; H01G 4/248; H01G 4/30; H01G 4/32
See application file for complete search history.

(56) References Cited

U.S. PATENT DOCUMENTS

| | | | | |
|---|---|---|---|---|
| 2014/0301015 A1* | 10/2014 | Kim | ........................ | H01G 4/12 29/25.03 |
| 2015/0340155 A1* | 11/2015 | Fukunaga | ................ | H01G 4/30 361/301.4 |
| 2015/0348712 A1* | 12/2015 | Lee | ........................ | H01G 4/30 156/89.12 |
| 2016/0126014 A1* | 5/2016 | Lee | ........................ | H01G 4/224 29/25.42 |
| 2016/0196918 A1* | 7/2016 | Hong | .................... | H01G 4/232 361/301.4 |
| 2016/0351335 A1* | 12/2016 | Kato | ...................... | H01G 4/232 |
| 2017/0018363 A1* | 1/2017 | Tanaka | ..................... | H01G 4/30 |
| 2017/0169952 A1* | 6/2017 | Kato | .................... | H01G 4/2325 |
| 2017/0243697 A1* | 8/2017 | Mizuno | ................ | H01G 4/1227 |
| 2018/0182555 A1* | 6/2018 | Kowase | ................... | H01G 4/30 |
| 2018/0240598 A1* | 8/2018 | Tanaka | ................... | H01G 4/232 |
| 2019/0252120 A1* | 8/2019 | Sakate | ..................... | B32B 37/10 |
| 2019/0348222 A1* | 11/2019 | Kato | .................... | H01G 4/1227 |
| 2020/0035416 A1* | 1/2020 | Kwon | ..................... | H01G 4/30 |

(Continued)

FOREIGN PATENT DOCUMENTS

JP    2011-124429 A    6/2011
JP    2017-011172 A    1/2017

*Primary Examiner* — Michael P McFadden
(74) *Attorney, Agent, or Firm* — Stein IP, LLC

(57) ABSTRACT

A multilayer ceramic device includes a multilayer chip. The multilayer chip has a capacity section, a side margin and an intermediate portion. The intermediate portion is provided between the capacity section and the side margin. An A/B ratio is larger in the side margin than in the capacity section, and is smaller in the intermediate portion than in the capacity section.

20 Claims, 6 Drawing Sheets

(56) References Cited

U.S. PATENT DOCUMENTS

| | | | |
|---|---|---|---|
| 2020/0111613 A1* | 4/2020 | Teraoka | H01G 4/012 |
| 2020/0411248 A1* | 12/2020 | Hashimoto | H01G 4/1227 |
| 2021/0098194 A1* | 4/2021 | Teraoka | H01G 4/012 |

* cited by examiner

MULTILAYER CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2022-037359, filed on Mar. 10, 2022, the entire contents of which are incorporated herein by reference.

FIELD

A certain aspect of the present invention relates to a multilayer ceramic electronic device and a manufacturing method of the multilayer ceramic electronic device.

BACKGROUND

Multilayer ceramic electronic devices such as multilayer ceramic capacitors are used to remove noise in high-frequency communication systems typified by mobile phones.

SUMMARY OF THE INVENTION

According to an aspect of the present invention, there is provided a multilayer ceramic device including: a multilayer chip that has a multilayer portion in which a plurality of dielectric layers and a plurality of internal electrode layers are alternately stacked, a main component of the plurality of dielectric layers being a ceramic having a perovskite structure represented by a general formula $ABO_3$ having an A site and a B site, the plurality of internal electrode layers being arranged so as to be alternately exposed on two opposing end faces of the multilayer chip, and has an upper face and a lower face in a stacking direction and two side faces in addition to the two end faces, wherein the multilayer chip has a capacity section, a side margin and an intermediate portion, the capacity section having a structure in which internal electrode layers connected to different end faces face each other, the side margin covering end portions of the plurality of dielectric layers and the plurality of internal electrode layers on ends on the side of the two side faces, a main component of the side margin being a ceramic having a perovskite structure represented by a general formula $ABO_3$ having an A site and a B site, the intermediate portion being provided between the capacity section and the side margin, a main component of the intermediate portion being a ceramic having a perovskite structure represented by a general formula $ABO_3$, wherein an A/B ratio is larger in the side margin than in the capacity section, and is smaller in the intermediate portion than in the capacity section.

According to another aspect of the present invention, there is provided a manufacturing method of a multilayer ceramic electronic device including: preparing a ceramic multilayer structure that has a multilayer structure, an intermediate sheet and a side margin sheet, the multilayer structure having a structure in which a plurality of ceramic green sheets and a plurality of internal electrode patterns are alternately stacked, a main component of the plurality of ceramic green sheets being a ceramic having a perovskite structure represented by a general formula $ABO_3$ having an A site and a B site, the plurality of internal electrode patterns being arranged so as to be alternately exposed on two opposing end faces of the multilayer portion, the intermediate sheet and the side margin sheet being stacked in order on two side faces of the multilayer structure, the two side faces being other than an upper face, a lower face in a stacking direction and the two end faces, a main component of the intermediate sheet being a ceramic having a perovskite structure represented by a general formula $ABO_3$ having an A site and a B site, a main component of the side margin sheet being a ceramic having a perovskite structure represented by a general formula $ABO_3$ having an A site and a B site; and firing the ceramic multilayer structure, wherein an A/B ratio is larger in the side margin sheet than in the ceramic green sheet and is smaller in the intermediate sheet than in the ceramic green sheet.

DETAILED DESCRIPTION

A multilayer ceramic electronic device has a capacity section having an electrostatic capacity and side margins sandwiching the capacity section. Since the amount of diffusion from the internal electrode layer is small in the side margins, the densification temperature is higher than that in the capacity section, and there is a possibility that problems in moisture resistance may occur due to insufficient densification compared to the capacity section. In order to promote the densification of the side margins, there is a method of adding silicon or manganese to the side margins (Japanese Patent Application Publication No. 2011-124429 and Japanese Patent Application Publication No. 2017-011172). However, silicon or manganese diffuses into the capacity section. In this case, dielectric constant decreases and the reliability may be degraded. Therefore, it is preferable to make the composition of the side margins and the capacity section as close to the same as possible without adding additives to the side margins.

Another method is to lower the densification temperature of the side margins by increasing the molar ratio of barium to titanium (Ba/Ti ratio) in the side margins rather than in the capacity section. However, in this case, due to the difference in the Ba/Ti ratio, barium tends to diffuse from the side margins into the capacity section, and abnormal grain growth tends to occur in the capacity section, possibly degrading reliability.

A description will be given of an embodiment with reference to the accompanying drawings.

Figure 1:
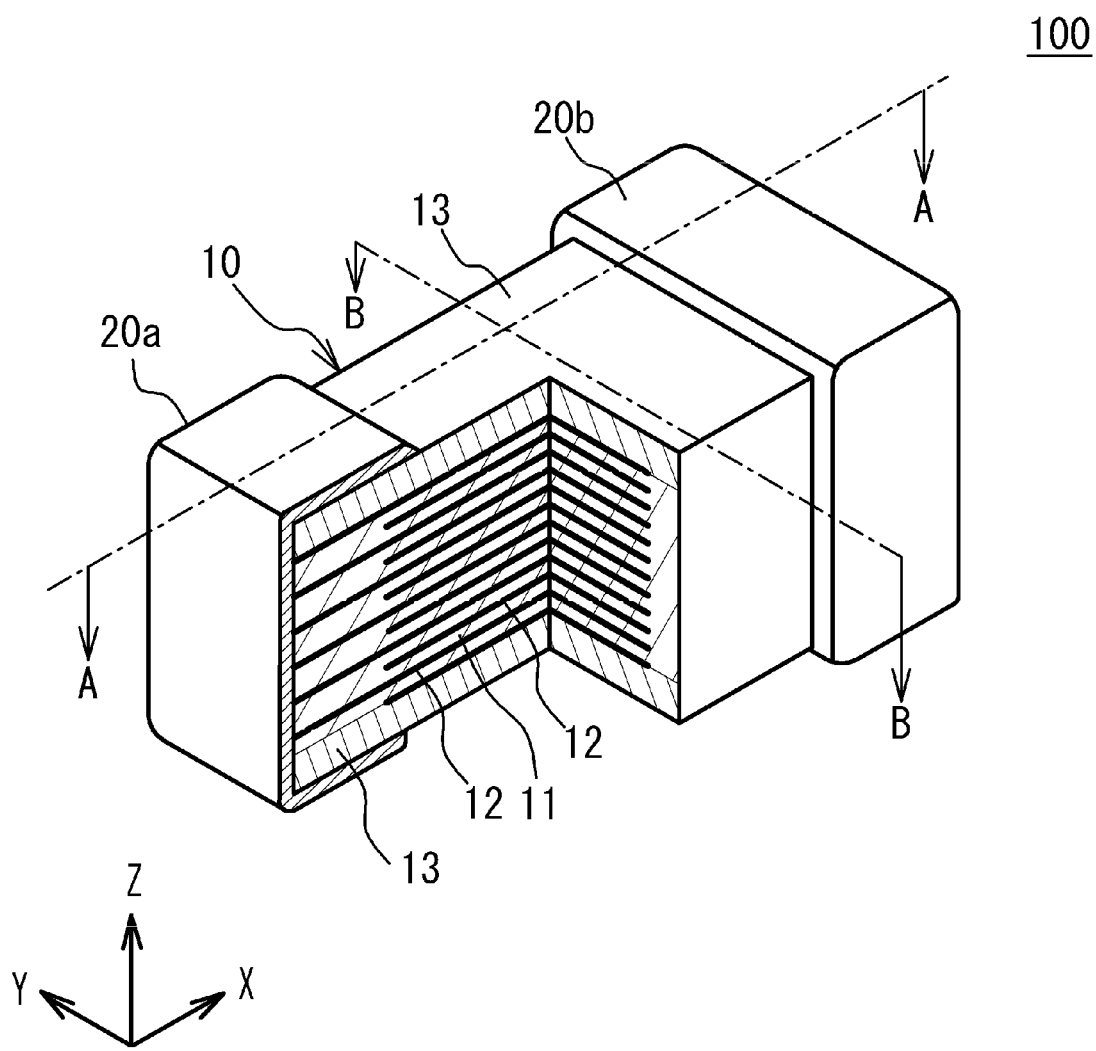
FIG. 1 illustrates a perspective view of a multilayer ceramic capacitor in which a cross section of a part of the multilayer ceramic capacitor is illustrated.
Figure 2:
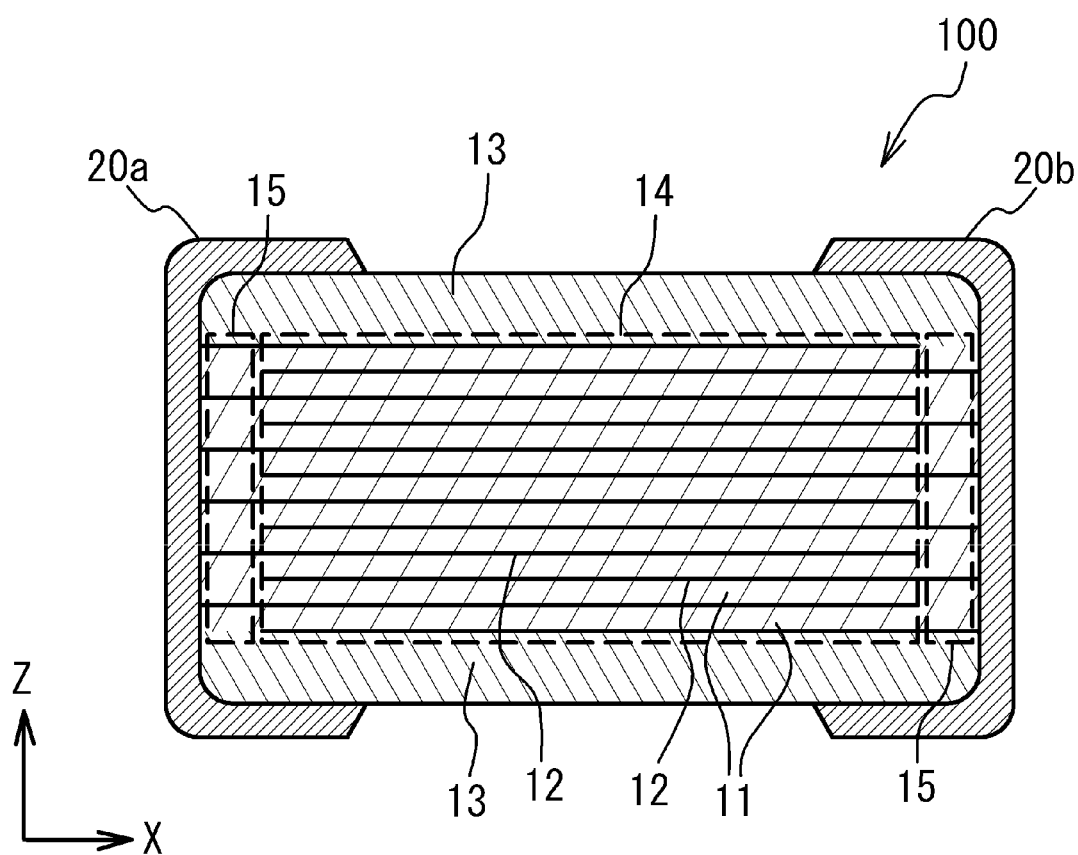
FIG. 2 illustrates a cross sectional view taken along a line A-A of FIG. 1.
Figure 3:
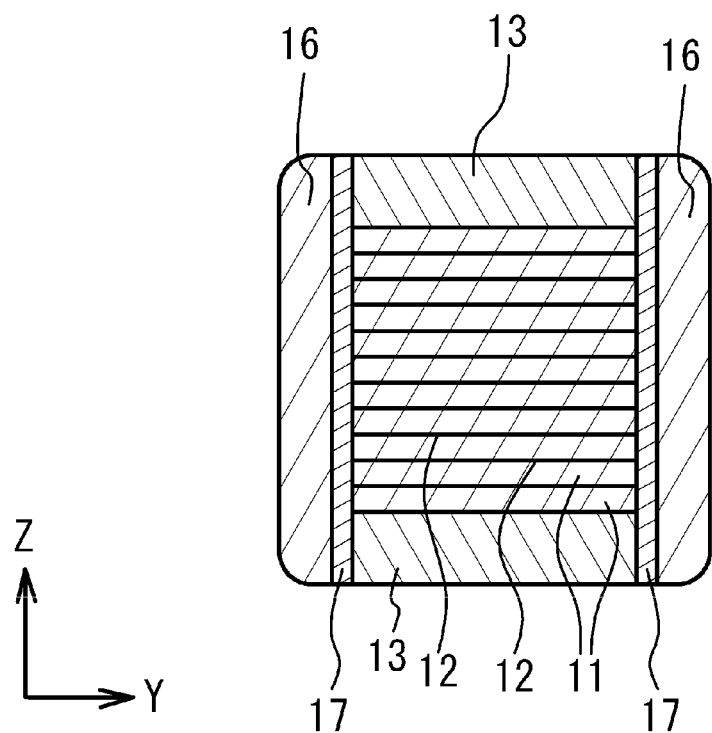
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11. The structure of the multilayer ceramic capacitor 100 is not limited to FIG. 1 to FIG. 3 if the internal electrode layers are respectively exposed to two different faces and are respectively connected to two different external electrodes.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layers 12 are mainly composed of base metals such as nickel, copper (Cu), and tin (Sn). As the internal electrode layer 12, noble metals such as platinum (Pt), palladium (Pd), silver (Ag), gold (Au), and alloys containing these noble metals may be used. The thickness of the internal electrode layer 12 is, for example, 0.1 μm or more and 3 μm or less, 0.1 μm or more and 1 μm or less, or 0.1 μm or more and 0.5 μm or less.

The dielectric layer 11 is a dielectric composition, and is mainly composed of, for example, a ceramic material having a perovskite structure represented by the general formula $ABO_3$. The perovskite structure contains $ABO_{3-\alpha}$ outside the stoichiometric composition. In this embodiment, barium titanate ($BaTiO_3$) is used as the ceramic material. For example, the dielectric layer 11 contains 90 at % or more of barium titanate. The thickness of the dielectric layer 11 is, for example, 0.2 μm or more and 10 μm or less, 0.2 μm or more and 5 μm or less, or 0.2 μm or more and 2 μm or less.

Additives may be added to the dielectric layer 11. As additives to the dielectric layer 11, zirconium (Zr), hafnium (Hf), magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges in the Y-axis direction of the stacked internal electrode layers 12 in the extension direction toward the two side faces. The side margin 16 does not generate electrical capacity. A joint portion 17 that joins the side margin 16 and the capacity section 14 is provided between the side margin 16 and the capacity section 14 in the Y-axis direction. The side margin 16 and the portion joint 17 are mainly composed of barium titanate. For example, the side margin 16 and the joint portion 17 contain 90% or more of barium titanate.

In the present embodiment, the A/B ratio in barium titanate having a perovskite structure represented by the general formula $ABO_3$, that is, the molar ratio of barium to 100 mol of titanium (Ba/Ti ratio) is larger in the side margin 16 than in the capacity section 14. The A/B ratio is smaller in the joint portion 17 than in the capacity section 14. With this configuration, the Ba/Ti ratio in the side margins 16 is large, so the densification temperature of the side margins 16 can be lowered. This reduces the porosity of the side margins 16 and improves the moisture resistance. Next, since the Ba/Ti ratio is smaller in the joint portion 17 than in the capacity section 14, the barium in the side margin 16 is mainly diffused into the joint portion 17, and the diffusion of barium from the side margin 16 to the capacity section 14 is suppressed. This suppresses abnormal grain growth in the capacity section 14, prolongs the life of the multilayer ceramic capacitor 100, and improves reliability. As described above, according to the present embodiment, both good moisture resistance and good reliability can be achieved. The A/B ratio of the dielectric layer in the capacity section is obtained, for example, by measuring the average of 10 points at 50% of the thickness. The A/B ratio of the side margin is obtained by measuring the average of 10 points at a position 5 µm from the surface, for example. The A/B ratio of the joint portion is obtained, for example, by measuring the average of 10 points at a position 5 µm away from the end of the internal electrode.

When the Ba/Ti ratio in the capacity section 14 is close to stoichiometry, the reliability of the multilayer ceramic capacitor 100 is greatly affected if the A/B ratio fluctuates even by 1/1000 due to the mixing of a small amount of zirconium. Therefore, in the capacity section 14, it is preferable to make the Ba/Ti ratio smaller than the stoichiometry. For example, the Ba/Ti ratio in the capacity section 14 is preferably 0.980 or less, more preferably 0.970 or less, and even more preferably 0.965 or less.

On the other hand, if the Ba/Ti ratio in the capacity section 14 is too small, the densification temperature of the capacity section 14 may be high, and the capacity section 14 may not be sufficiently densified. Therefore, it is preferable to set a lower limit for the Ba/Ti ratio in the capacity section 14. For example, the Ba/Ti ratio in the capacity section 14 is preferably 0.970 or higher, more preferably 0.973 or higher, and even more preferably 0.975 or higher.

If the Ba/Ti ratio in the side margins 16 is too large, the densification temperature of the side margins 16 increases, and the side margins 16 may not be sufficiently densified. Therefore, it is preferable to set an upper limit for the Ba/Ti ratio in the side margins 16. For example, the Ba/Ti ratio in the side margins 16 is preferably 1.010 or less, preferably 1.008 or less, and preferably 1.006 or less.

On the other hand, if the Ba/Ti ratio in the side margins 16 is too small, abnormal grain growth may occur in the side margins 16. Therefore, it is preferable to set a lower limit for the Ba/Ti ratio in the side margins 16. For example, the Ba/Ti ratio in the side margins 16 is preferably 1.005 or more, more preferably 1.0055 or more, and even more preferably 1.006 or more.

If the Ba/Ti ratio at the joint portion 17 is too large, there is a risk that the diffusion of barium from the side margin 16 to the capacity section 14 cannot be sufficiently suppressed. Therefore, it is preferable to set an upper limit for the Ba/Ti ratio in the joint portion 17. For example, the Ba/Ti ratio in the joint portion 17 is preferably 0.960 or less, more preferably 0.955 or less, and even more preferably 0.950 or less.

On the other hand, if the Ba/Ti ratio in the joint portion 17 is too small, the densification temperature rises and the joint portion 17 may not be sufficiently densified. Therefore, it is preferable to set a lower limit for the Ba/Ti ratio in the joint portion 17. For example, the Ba/Ti ratio in the joint portion 17 is preferably 0.950 or more, more preferably 0.96 or more, and even more preferably 0.97 or more.

If the porosity of the side margins 16 is high, moisture may easily enter, and the moisture resistance of the multilayer ceramic capacitor 100 may decrease. Therefore, it is preferable to set an upper limit for the porosity in the side margins 16. For example, in a cross section along the stacking direction, the area ratio of pores is preferably less than 10%, more preferably 5% or less, and even more preferably 3% or less. The porosity of the side margins 16 can be lowered by lowering the densification temperature of the side margins to promote densification.

The dielectric layer 11 in the capacity section 14 may contain at least one of zirconium and hafnium at the B site in the perovskite structure. For example, zirconium and hafnium may form a substitution solid solution at the B site of barium titanate. The dielectric layer 11 containing at least one of zirconium and hafnium suppresses diffusion of barium from the side margin 16 into dielectric layer 11.

The thickness of the joint portion 17 in the Y-axis direction is, for example, 1 µm or more and 10 µm or less, 20 µm or more and 40 µm or less, or 80 µm or more and 100 µm or less. The thickness of the joint portion 17 in the Y-axis direction is 0.1 to 0.3 times, and 0.4 to 0.6 times or 0.8 to 1.0 times as the thickness of the side margin 16 in the Y-axis direction.

In the above example, attention is paid to the Ba/Ti ratio as an example of the A/B ratio. However, when at least one of the A site and the B site contains another element, the A/B ratio is, is the molar ratio of the total A-site elements to the total B-site elements.

Figure 4:
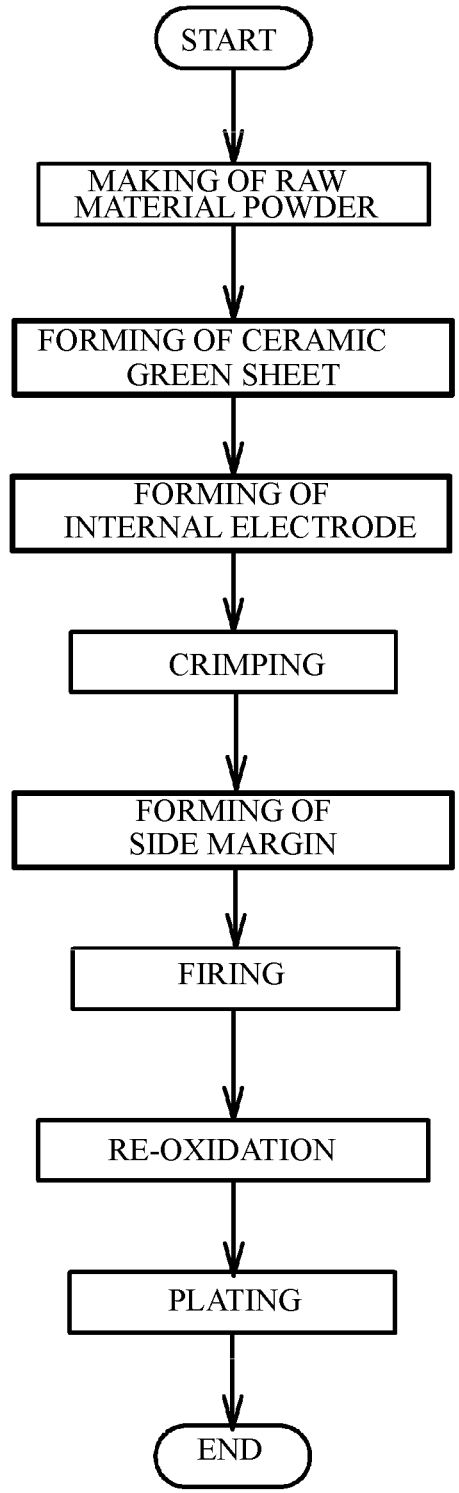
FIG. 4 illustrates a manufacturing method of a multilayer ceramic capacitor.

Next, a description will be given of a manufacturing method of the multilayer ceramic capacitors 100. FIG. 4 illustrates a manufacturing method of the multilayer ceramic capacitor 100.

(Making process of raw material powder) A dielectric material for forming the dielectric layer 11 is prepared. The A-site element and the B-site element contained in the dielectric layer 11 are usually contained in the dielectric layer 11 in the form of sintered particles of $ABO_3$. For example, barium titanate is a tetragonal compound having a perovskite structure and exhibits a high dielectric constant. This barium titanate can generally be obtained by reacting a titanium raw material such as titanium dioxide with a barium raw material such as barium carbonate to synthesize barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of zirconium, hafnium, magnesium, manganese, molybdenum, vanadium, chromium, rare earth elements (yttrium, samarium, europium, gadolinium, terbium, dysprosium, holmium, erbium, thulium and ytterbium) or an oxide of cobalt, nickel, lithium, boron, sodium, potassium or silicon, or a glass including cobalt, nickel, lithium, boron, sodium, potassium or silicon.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained. Zirconia beads or the like can be used for pulverization. By using zirconia beads, a small amount of zirconium can be added to the dielectric material.

(Forming process of ceramic green sheet) Next, a binder such as polyvinyl butyral (PVB) resin, an organic solvent such as ethanol or toluene, and a plasticizer are added to the resulting dielectric material and wet-blended. With use of the resulting slurry, a ceramic green sheet 52 is formed on a base material 51 by, for example, a die coater method or a doctor blade method, and then dried. The base material 51 is, for example, PET (polyethylene terephthalate) film. The forming process is not illustrated. The forming process of the dielectric layer is not illustrated for simplification.

Figure 5A:
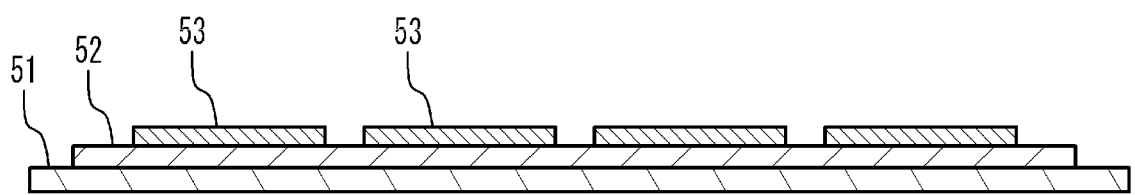
FIG. 5A illustrates a forming process of an internal electrode.

(Forming process of internal electrode layer) Next, as illustrated in FIG. 5A, an internal electrode pattern 53 is formed on the ceramic green sheet 52. In FIG. 5A, as an example, four parts of the internal electrode pattern 53 are formed on the ceramic green sheet 52 and are spaced from each other. The ceramic green sheet 52 on which the internal electrode pattern 53 is formed is a stack unit. A metal paste of the main component metal of the internal electrode layer 12 is used as the internal electrode pattern 53. Ceramic particles are added to the metal paste as a co-material. Although the main component of the ceramic particles is not particularly limited, it is preferably the same as the main component ceramic of the dielectric layer 11. For example, barium titanate having an average particle size of 50 nm or less may be uniformly dispersed.

Figure 5B:
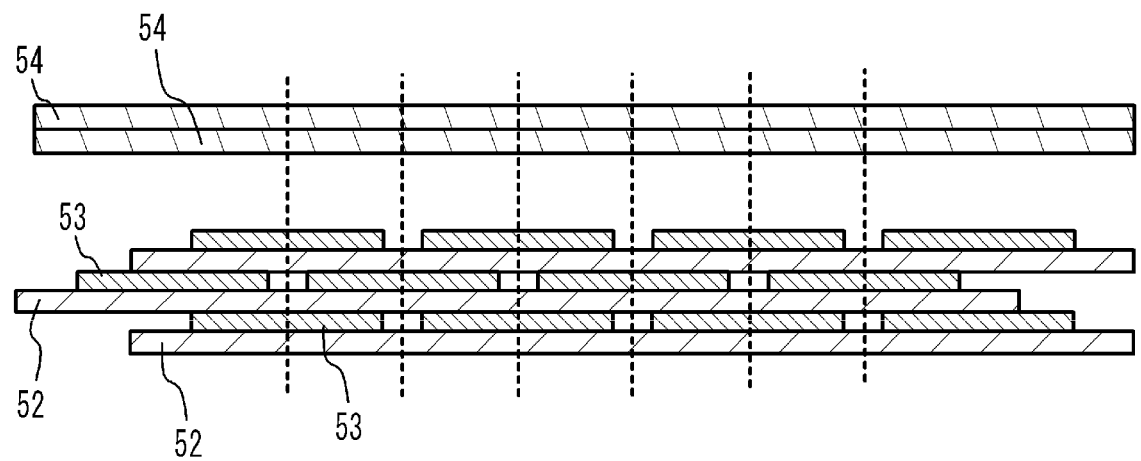
FIG. 5B illustrates a crimping process.
Figure 6A:
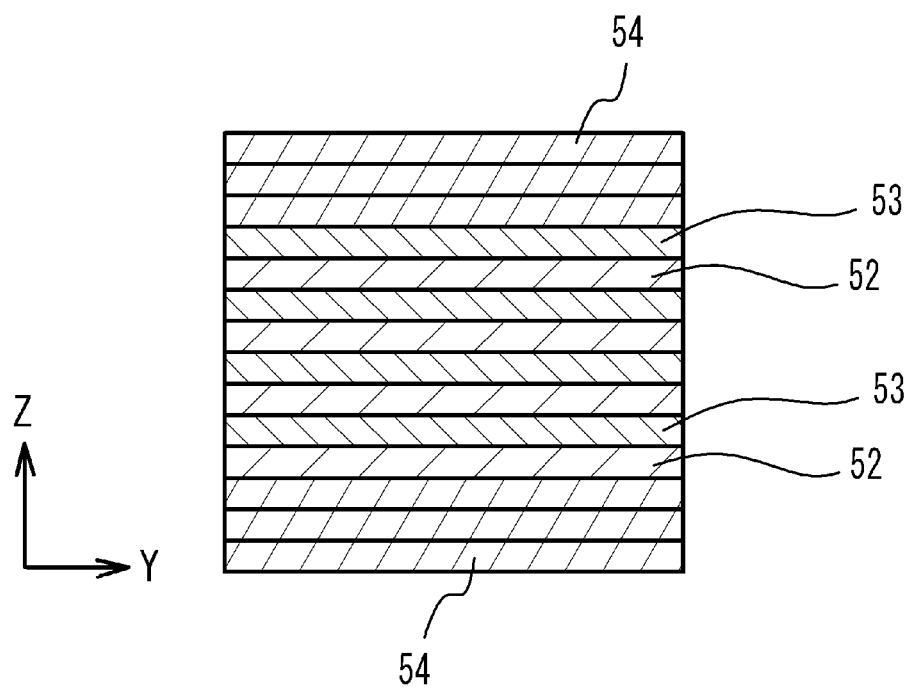
FIG. 6A and FIG. 6B illustrate a forming process of a side margin.

(Crimping process) Next, the ceramic green sheets 52 are peeled from the base materials 51. As illustrated in FIG. 5B, the stack units are stacked. Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 5B, the multilayer structure is cut along a dotted line. The components of the cover sheet 54 may be the same as those of the ceramic green sheet 52. Alternatively, the additive in the cover sheet 54 may be different from that in the ceramic green sheet 52. FIG. 6A is a cross-sectional view along the YZ plane of the multilayer structure after being cut.

Figure 6B:
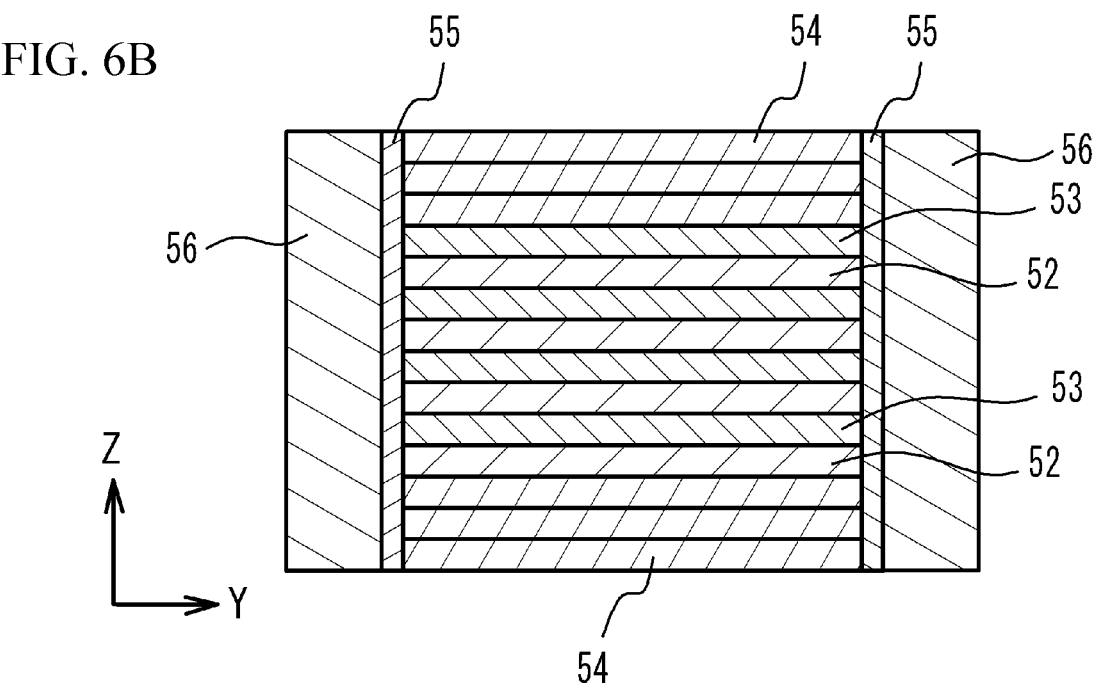

(Side margin formation process) Next, as illustrated in FIG. 6B, a joint sheet 55 and a side margin sheet 56 are attached in order to the Y-axis direction end of the multilayer structure. Barium titanate is used as the main component ceramic in the joint sheet 55 and the side margin sheet 56. Materials are selected so that the molar ratio of barium to 100 mol of titanium is larger in the side margin sheet 56 than in the ceramic green sheet 52 and smaller in the joint sheet 55 than in the ceramic green sheet 52.

(Firing process) The resulting ceramic multilayer structure thus obtained is subjected to a binder removal treatment in an $N_2$ atmosphere. And then, an external electrode paste, which will be the base layer, is applied on the ceramic multilayer structure by a dipping method or the like. The resulting ceramic multilayer structure is fired for 5 minutes to 10 hours in a reductive atmosphere having an oxygen partial pressure of $10^{-12}$ to $10^{-9}$ MPa in a temperature range of 1160 degrees C. to 1280 degrees C.

(Re-oxidizing process) In order to return oxygen to the barium titanate, which is the partially reduced main phase of the dielectric layer 11 fired in a reducing atmosphere, $N_2$ and water vapor are mixed at about 1000° C. to the extent that the internal electrode layers 12 are not oxidized. Heat treatment may be performed in gas or in the air at 500° C. to 700° C. This step is called a re-oxidation process.

(Plating process) After that, by a plating process, plated layers of Cu, Ni, Sn or the like may be formed on the base layers of the external electrodes 20a and 20b. With the process, the multilayer ceramic capacitor 100 is obtained.

According to the manufacturing method according to the present embodiment, the molar ratio of barium to 100 mol of titanium (Ba/Ti ratio) is higher in the side margins 16 than in the capacity section 14, and is higher in the joint portion 17 than in the capacity section 14. Accordingly, both good moisture resistance and good reliability can be achieved.

When the Ba/Ti ratio in the ceramic green sheet 52 is close to stoichiometry, the reliability of the multilayer ceramic capacitor 100 is greatly affected if the A/B ratio fluctuates even by 1/1000 due to the mixing of a small amount of zirconium. Therefore, in the ceramic green sheet 52, it is preferable to make the Ba/Ti ratio smaller than the stoichiometry. For example, the Ba/Ti ratio in the ceramic green sheet 52 is preferably 0.980 or less, more preferably 0.970 or less, and even more preferably 0.965 or less.

On the other hand, if the Ba/Ti ratio in the ceramic green sheet 52 is too small, the densification temperature of the ceramic green sheet 52 increases, and there is a risk that the capacity section 14 cannot be sufficiently densified. Therefore, it is preferable to set a lower limit for the Ba/Ti ratio in the ceramic green sheet 52. For example, the Ba/Ti ratio in the ceramic green sheet 52 is preferably 0.970 or higher, more preferably 0.973 or higher, and even more preferably 0.975 or higher.

If the Ba/Ti ratio in the side margin sheet 56 is too large, the densification temperature of the side margin 16 increases, and the side margin 16 may not be sufficiently densified. Therefore, it is preferable to set an upper limit for the Ba/Ti ratio in the side margin sheet 56. For example, the Ba/Ti ratio in the side margin sheet 56 is preferably 1.010 or less, preferably 1.008 or less, and preferably 1.006 or less.

On the other hand, if the Ba/Ti ratio in the side margin sheet 56 is too small, abnormal grain growth may occur in the side margin 16. Therefore, it is preferable to set a lower limit for the Ba/Ti ratio in the side margin sheet 56. For example, the Ba/Ti ratio in the side margin sheet 56 is preferably 1.005 or more, more preferably 1.0055 or more, and even more preferably 1.006 or more.

If the Ba/Ti ratio in the joint sheet 55 is too large, the diffusion of barium from the side margin 16 to the capacity section 14 may not be sufficiently suppressed. Therefore, it is preferable to set an upper limit for the Ba/Ti ratio in the joint sheet 55. For example, the Ba/Ti ratio in the joint sheet 55 is preferably 0.960 or less, more preferably 0.955 or less, and even more preferably 0.950 or less.

On the other hand, if the Ba/Ti ratio in the joint sheet 55 is too small, the densification temperature increases, and there is a risk that the joint portion cannot be sufficiently densified. Therefore, it is preferable to set a lower limit for the Ba/Ti ratio in the joint sheet 55. For example, the Ba/Ti ratio in the joint sheet 55 is preferably 0950 or more, more preferably 0.960 or more, and even more preferably 0.970 or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Examples 1-3 and Comparative Examples 1-5)

A binder, an organic solvent, and a plasticizer were added to the powder of barium titanate and wet-mixed. Using the obtained slurry, a ceramic green sheet was formed on the base material and dried, and then an internal electrode pattern was deposited to form a stack unit. A cover sheet was stacked on the upper and lower sides of a multilayer structure obtained by stacking the stack units, and was thermocompressed, and cut into a predetermined chip size. Next, a joint sheet containing ceramic as a main component of barium titanate and a side margin sheet were sequentially attached to the end of the multilayer structure in the Y-axis direction. The ceramic multilayer structure thus obtained was subjected to binder removal treatment and then fired in a reducing atmosphere. Materials were selected so that the Ba/Ti ratio satisfied the following: side margin sheet>ceramic green sheet>bonding sheet.

(Ba/Ti ratio) For the multilayer ceramic capacitors of Examples 1 to 3 and Comparative Examples 1 to 5, the Ba/Ti ratio of each part was examined. Specifically, the multilayer ceramic capacitor was polished with a polishing machine so that the cross section was exposed, and the polished cross section was measured using LA-ICP-MS (laser ablation inductively coupled plasma mass spectrometry). Table 1 shows the results. The midpoint of the Ba/Ti ratio gradient was defined as the boundary between the side margin and the joint portion. For example, in Examples 1 and 2 and Comparative Examples 1 to 4, the region from the Y-axis direction end of the multilayer ceramic capacitor to 50 μm was defined as the side margin, and the 10 μm region between the side margin and the capacity section was defined as the joint portion.

In Example 1, the Ba/Ti ratio in the side margin was 1.010, the Ba/Ti ratio in the joint portion was 0.960, and the Ba/Ti ratio in the capacity section was 0.980. In Example 2, the Ba/Ti ratio in the side margin was 1.006, the Ba/Ti ratio in the joint portion was 0.960, and the Ba/Ti ratio in the capacity section was 0.980. In Comparative Example 1, the Ba/Ti ratio in the side margin was 0.980, the Ba/Ti ratio in the joint portion was 0.980, and the Ba/Ti ratio in the capacity section was 0.980. In Comparative Example 2, the Ba/Ti ratio in the side margin was 0.940, the Ba/Ti ratio in the joint portion was 0.960, and the Ba/Ti ratio in the capacity section was 0.980. In Comparative Example 3, the Ba/Ti ratio in the side margin was 1.003, the Ba/Ti ratio in the joint portion was 0.997, and the Ba/Ti ratio in the capacity section was 0.960. In Comparative Example 4, the Ba/Ti ratio in the side margin was 1.001, the Ba/Ti ratio in the joint portion was 0.990, and the Ba/Ti ratio in the capacity section was 0.980.

(Moisture resistance) Regarding the multilayer ceramic capacitors of Examples 1 and 2 and Comparative Examples 1 to 4, the multilayer ceramic capacitors were polished with a polishing machine so that the cross section was exposed, and the exposed cross section was observed with a SEM (scanning electron microscope) to determine the pore ratio= (cross-sectional area of pores)/(cross-sectional area of side margin) of the side margin.

In Example 1, the side margin porosity was 5%. In Example 2, the side margin porosity was 3%. In Comparative Example 1, the side margin porosity was 20%. In Comparative Example 2, the side margin porosity was 25%. In Comparative Example 3, the side margin porosity was 2%. In Comparative Example 4, the side margin porosity was 1%.

Since the moisture resistance decreases as the porosity increases, when the porosity exceeded 10%, the moisture resistance was judged to be bad "x", and when the porosity was less than 10%, the moisture resistance was judged to be good "○". For Examples 1 and 2 and Comparative Examples 3 and 4, the moisture resistance was judged to be good "○". Regarding Comparative Examples 1 and 2, the moisture resistance was judged to be bad "x".

(Lifetime) The highly accelerated life was measured for the multilayer ceramic capacitors of Examples 1 and 2 and Comparative Examples 1 to 4. Specifically, the test was performed at 170° C. and 125 V until all 20 samples failed, and the average time of their lives was taken as the lifetime. In Example 1, the lifetime was 4500 minutes. In Example 2, the lifetime was 4900 minutes. In Comparative Example 1, the lifetime was 4800 minutes. In Comparative Example 2, the lifetime was 4200 minutes. In Comparative Example 3,

TABLE 1

|  | SIDE MARGIN Ba/Ti | JOINT PORTION Ba/Ti | CAPACITY SECTION Ba/Ti | POROSITY (%) | MOISTURE RESISTANCE | LIFE min | LIFE | OVERALL JUDGEMENT |
|---|---|---|---|---|---|---|---|---|
| EXAMPLE 1 | 1.010 | 0.960 | 0.980 | 5 | ○ | 4500 | ○ | ○ |
| EXAMPLE 2 | 1.006 | 0.960 | 0.980 | 3 | ○ | 4900 | ○ | ○ |
| COMPARATIVE EXAMPLE 1 | 0.980 | 0.980 | 0.980 | 20 | x | 4800 | ○ | x |
| COMPARATIVE EXAMPLE 2 | 0.940 | 0.960 | 0.980 | 25 | x | 4200 | ○ | x |
| COMPARATIVE EXAMPLE 3 | 1.003 | 0.997 | 0.960 | 2 | ○ | 200 | x | x |
| COMPARATIVE EXAMPLE 4 | 1.001 | 0.990 | 0.980 | 1 | ○ | 500 | x | x | the lifetime was 200 minutes. In Comparative Example 4, the lifetime was 500 minutes.

When the lifetime was 3000 minutes or more, the life characteristic was judged to be good "○". When the lifetime was less than 3000 minutes, the life characteristic was judged to be bad "x". For Examples 1 and 2 and Comparative Examples 1 and 2, the life characteristic was judged to be good "○". For Comparative Examples 3 and 4, the life characteristic was judged to be bad "x".

(Overall judgment) When both the moisture resistance and life characteristic were judged to be good "○", the overall judgment was judged to be good "○". When either one of the moisture resistance and life characteristics was judged to be bad "x", the overall judgment was judged to be bad "x".

In Examples 1 and 2, the overall judgment was judged to be good "○". It is thought that this was because the Ba/Ti ratio satisfied the relationship of side margin>capacity section>joint portion, and good denseness was obtained in the side margin, and abnormal grain growth in the capacity section was suppressed.

In all of Comparative Examples 1 to 4, the overall judgment was judged as bad "x". In Comparative Examples 1 and 2, the Ba/Ti ratio satisfied the relationship of side margin≤joint portion≤capacity section. In Comparative Examples 3 and 4, since the Ba/Ti ratio satisfied the side margin≥joint portion≥capacity section, the Ba/Ti ratio of the joint portion did not become sufficiently small, and Ba diffused into the capacity section, causing an abnormal grain growth.

Although the embodiments of the present invention have been described in detail, it is to be understood that the various change, substitutions, and alterations could be made hereto without departing from the spirit and scope of the invention.

What is claimed is:

1. A multilayer ceramic device comprising:
a multilayer chip that has a multilayer portion in which a plurality of dielectric layers and a plurality of internal electrode layers are alternately stacked, a main component of the plurality of dielectric layers being a ceramic having a perovskite structure represented by a general formula $ABO_3$ having an A site and a B site, the plurality of internal electrode layers being arranged so as to be alternately exposed on two opposing end faces of the multilayer chip, and has an upper face and a lower face in a stacking direction and two side faces in addition to the two end faces,
wherein the multilayer chip has a capacity section, a side margin and an intermediate portion, the capacity section having a structure in which internal electrode layers connected to different end faces face each other, the side margin covering end portions of the plurality of dielectric layers and the plurality of internal electrode layers on ends on the side of the two side faces, a main component of the side margin being a ceramic having a perovskite structure represented by a general formula $ABO_3$ having an A site and a B site, the intermediate portion being provided between the capacity section and the side margin, a main component of the intermediate portion being a ceramic having a perovskite structure represented by a general formula $ABO_3$, and
wherein an A/B ratio is larger in the side margin than in the capacity section, and is smaller in the intermediate portion than in the capacity section.

2. The multilayer ceramic electronic device as claimed in claim 1, wherein main components of the plurality of dielectric layers, the side margin and the intermediate portion are barium titanate.

3. The multilayer ceramic electronic device as claimed in claim 1, wherein the A/B ratio of the plurality of dielectric layers in the capacity section is 0.980 or less.

4. The multilayer ceramic electronic device as claimed in claim 1, wherein the A/B ratio of the plurality of dielectric layers in the capacity section is 0.970 or more.

5. The multilayer ceramic electronic device as claimed in claim 1, wherein the A/B ratio of the plurality of dielectric layers in the capacity section is 0.975 or more.

6. The multilayer ceramic electronic device as claimed in claim 1, wherein the A/B ratio of the side margin is 1.005 or more and 1.010 or less.

7. The multilayer ceramic electronic device as claimed in claim 1, wherein the A/B ratio of the side margin is 1.008 or less.

8. The multilayer ceramic electronic device as claimed in claim 1, wherein the A/B ratio of the side margin is 1.006 or less.

9. The multilayer ceramic electronic device as claimed in claim 1, wherein the A/B ratio of the intermediate portion is 0.960 or less.

10. The multilayer ceramic electronic device as claimed in claim 1, wherein the A/B ratio of the intermediate portion is 0.955 or less.

11. The multilayer ceramic electronic device as claimed in claim 1, wherein the A/B ratio of the intermediate portion is 0.950 or more.

12. The multilayer ceramic electronic device as claimed in claim 1,
wherein the side margin includes pores,
wherein a ratio of an area of the pores in a cross section of the side margin is less than 10%.

13. The ceramic electronic device as claimed in claim 1, wherein the plurality of dielectric layers include at least one of zirconium and hafnium in the B site of the perovskite structure.

14. A manufacturing method of a multilayer ceramic electronic device comprising:
preparing a ceramic multilayer structure that has a multilayer structure, an intermediate sheet and a side margin sheet, the multilayer structure having a structure in which a plurality of ceramic green sheets and a plurality of internal electrode patterns are alternately stacked, a main component of the plurality of ceramic green sheets being a ceramic having a perovskite structure represented by a general formula $ABO_3$ having an A site and a B site, the plurality of internal electrode patterns being arranged so as to be alternately exposed on two opposing end faces of the multilayer portion, the intermediate sheet and the side margin sheet being stacked in order on two side faces of the multilayer structure, the two side faces being other than an upper face, a lower face in a stacking direction and the two end faces, a main component of the intermediate sheet being a ceramic having a perovskite structure represented by a general formula $ABO_3$ having an A site and a B site, a main component of the side margin sheet being a ceramic having a perovskite structure represented by a general formula $ABO_3$ having an A site and a B site; and
firing the ceramic multilayer structure,
wherein an A/B ratio is larger in the side margin sheet than in the ceramic green sheet and is smaller in the intermediate sheet than in the ceramic green sheet.

15. The method as claimed in claim 14, wherein main components of the ceramic green sheet, the intermediate sheet and the side margin sheet are barium titanate.

16. The method as claimed in claim 14, wherein the A/B ratio of the ceramic green sheet is 0.980 or less.

17. The method as claimed in claim 14, wherein the A/B ratio of the ceramic green sheet is 0.970 or more.

18. The method as claimed in claim 14, wherein the A/b ratio of the side margin sheet is 1.005 or more and 1.010 or less.

19. The method as claimed in claim 14, wherein the A/B ratio of the intermediate sheet is 0.960 or less.

20. The method as claimed in claim 14, wherein the A/B ratio of the intermediate sheet is 0.950 or more.

* * * * *